(12) United States Patent
Nanivadekar et al.

(10) Patent No.: US 11,671,404 B2
(45) Date of Patent: Jun. 6, 2023

(54) POLICY BASED MECHANISM TO EFFICIENTLY INTERPRET AND BLOCK INSECURE NETWORK COMMUNICATION

(71) Applicant: VMWARE, INC., Palo Alto, CA (US)

(72) Inventors: Mandar Nanivadekar, Pune (IN); Leena Shuklendu Soman, Pune (IN)

(73) Assignee: VMware, Inc., Palo Alto, CA (US)

( * ) Notice: Subject to any disclaimer, the term of this patent is extended or adjusted under 35 U.S.C. 154(b) by 154 days.

(21) Appl. No.: 17/004,169

(22) Filed: Aug. 27, 2020

(65) Prior Publication Data

US 2022/0021649 A1    Jan. 20, 2022

(30) Foreign Application Priority Data

Jul. 14, 2020  (IN) .............................. 202041029925

(51) Int. Cl.
*H04L 9/40* (2022.01)
*G06F 21/57* (2013.01)
*G06F 9/54* (2006.01)
*G06F 21/55* (2013.01)

(52) U.S. Cl.
CPC .......... *H04L 63/0236* (2013.01); *G06F 9/545* (2013.01); *G06F 21/577* (2013.01); *H04L 63/1425* (2013.01); *H04L 63/166* (2013.01); *H04L 63/20* (2013.01); *G06F 21/552* (2013.01)

(58) Field of Classification Search
CPC ... H04L 63/0236; H04L 63/166; H04L 63/20; H04L 63/1425; G06F 9/545; G06F 21/577; G06F 21/552
See application file for complete search history.

(56) References Cited

U.S. PATENT DOCUMENTS

| | | | |
|---|---|---|---|
| 2012/0230202 A1* | 9/2012 | Reed | H04L 63/0209 370/241 |
| 2013/0227272 A1† | 8/2013 | Cox et al. | |
| 2015/0128205 A1* | 5/2015 | Mahaffey | H04L 63/105 726/1 |
| 2018/0307833 A1† | 10/2018 | Noeth et al. | |
| 2019/0014086 A1† | 1/2019 | Meyer et al. | |
| 2019/0068555 A1* | 2/2019 | Tsirkin | H04L 63/0236 |
| 2020/0287920 A1* | 9/2020 | Mandrychenko | H04L 67/5651 |
| 2020/0322353 A1* | 10/2020 | Bhandari | H04L 63/1425 |

\* cited by examiner
† cited by third party

*Primary Examiner* — Cheng-Feng Huang
(74) *Attorney, Agent, or Firm* — Dinsmore & Shohl LLP (57) ABSTRACT

The disclosure provides an approach for network security. Embodiments include receiving, by a kernel of a first machine, via a hook in a protocol stack of the first machine, one or more packets of a connection between the first machine and a second machine Embodiments include generating a metadata object for the connection based on at least a subset of the one or more packets. Embodiments include adding the one or more packets to a queue accessible by a security component of the first machine. Embodiments include determining, based on the metadata object, whether to continue capturing additional packets of the connection. Embodiments include receiving, from the security component, a security determination regarding the connection based on the one or more packets. Embodiments include performing an action with respect to the connection based on the security determination.

18 Claims, 5 Drawing Sheets

POLICY BASED MECHANISM TO EFFICIENTLY INTERPRET AND BLOCK INSECURE NETWORK COMMUNICATION

RELATED APPLICATIONS

Benefit is claimed under 35 U.S.C. 119(a)-(d) to Foreign Application Serial No. 202041029925 filed in India entitled "POLICY BASED MECHANISM TO EFFICIENTLY INTERPRET AND BLOCK INSECURE NETWORK COMMUNICATION", on Jul. 14, 2020, by VMware, Inc., which is herein incorporated in its entirety by reference for all purposes.

BACKGROUND

SDN comprises a plurality of hosts in communication over a physical network infrastructure, each host having one or more virtualized endpoints such as VMs, containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs. Furthermore, certain aspects discussed herein may similarly be applicable to physical machines. In some embodiments, embodiments of the present disclosure may also be applicable to environments including both physical and virtual machines.

Any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

Applications in a data center or applications communicating over another type of network often use some form of secure communication. Legacy applications may still use plain text communication, which is a security risk. Furthermore, a communication channel that uses a weak, compromised, or outdated form of security is vulnerable to malicious attacks through which sensitive data may be compromised.

As such, there is a need for a scalable and efficient policy-based mechanism to understand and mitigate network communication vulnerabilities without affecting network throughput.

SUMMARY

Embodiments provide a method of network security. Embodiments include: receiving, by a kernel of a first machine, via a hook in a protocol stack of the first machine, one or more packets of a connection between the first machine and a second machine; generating, by the kernel, a metadata object for the connection based on at least a subset of the one or more packets; adding, by the kernel, the one or more packets to a queue accessible by a security component of the first machine; determining, by the kernel, based on the metadata object, whether to continue capturing additional packets of the connection; receiving, by the kernel, from the security component, a security determination regarding the connection based on the one or more packets; and performing, by the kernel, an action with respect to the connection based on the security determination.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for efficient policy-based network security enforcement. Techniques described herein involve implementing policies that restrict network traffic based on types of security associated with the network traffic or lack thereof. For example, a communication channel may be vulnerable to attack or interception due to weak, compromised, or outdated security, or due to a lack of security. Examples of problematic security may include deprecated SSL (secure socket layer) protocols, deprecated transport layer security (TLS) protocols (i.e., TLS 1.1), weak cipher specifications that a client proposes to a server to be used for encryption on the wire, weak cipher specifications that the server selects and uses for encryption on the wire, expired certificates and other certificate parameters that may prove to be insecure, invalid JA3 or JA3-S fingerprints calculated from client hello and server hello packets, deprecated elliptical curves used while negotiating TLS communication, and the like. For example, when new security risks are discovered, existing ciphers may be deprecated, and may therefore be considered insecure.

A malicious attack (e.g., performed by malware) on a physical computing system or VM often attacks the application level (e.g., by spreading through the operating environment, introducing new processes, manipulating processes to communicate with new insecure devices, etc). A security manager (eg., AppDefense™ from VMware, Inc in Palo Alto, Calif.) aims to protect against malicious attacks in data centers. The security manager is a data center endpoint security system that protects applications running on clients (e.g., VMs) in (e.g., logical) networks. For example, the security manager may allow or disallow connections, generate warnings or notifications, or perform other actions when a security threat is detected. In some embodiments, a security manager enforces policies defined in a management plane and/or by an administrator.

According to embodiments of the present disclosure, security policies are defined by an administrator, such as via a management plane, and sent, such as via a control plane, to client devices, such as VCIs running on hosts in a data center, where they are enforced using techniques described herein. Security policies may, for example, place restrictions on types of security that may be used for connections within the data center. In one example, a security policy disallows connections using certain types of security or disallows connections with no security (e.g., plain text packets).

In some embodiments, incoming and outgoing packets are routed to a kernel of an operating system (OS) of a client device via a hook in a protocol stack of the client device. The kernel generates a metadata object for each connection when it receives the first packet of the connection. As described in more detail below, the kernel updates the metadata object over time as additional packets of the connection are received and uses the metadata object to determine whether subsequent packets of the connection need to be processed, such as based on whether an initial handshake of the connection is complete. For example, as described in more detail below, the metadata object may track how many packets of a connection have been processed, whether the connection includes security, and/or whether to continue to capture packets for the connection. The metadata object improves efficiency, as it allows the kernel to determine when it no longer needs to process packets from a connection, thereby avoiding unnecessary processing.

The kernel places at least some packets of connections into a queue that is accessible by an application running in the "user mode" of the client device (a user mode application), and the user mode application processes the packets in the queue for policy enforcement purposes. In some embodiments, the user mode application extracts security attributes of connections from the packets and passes the security attributes to a security engine that determines whether connections comply with policies received from the management plane. The security engine then provides security determinations to the kernel, which performs actions based on the security determinations. For example, the kernel may allow or block connections based on the security determinations. Furthermore, an administrator may be notified if a connection does not comply with a policy, such as via signaling to the management plane.

Figure 1:
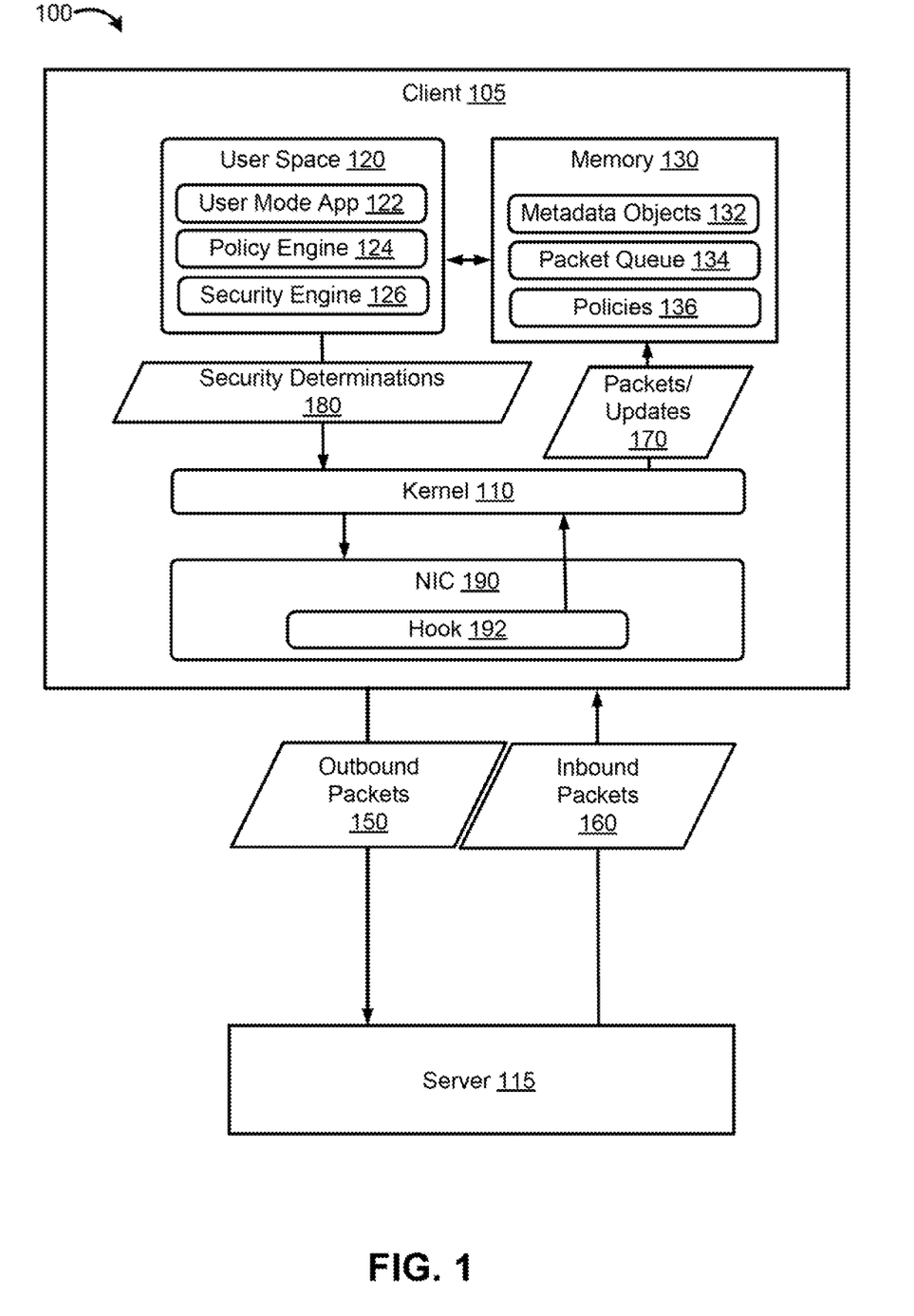
FIG. 1 depicts an example system for policy-based security enforcement according to embodiments of the present disclosure.

FIG. 1 depicts an example system 100 for policy-based security enforcement according to embodiments of the present disclosure.

System 100 includes a client 105 and a server 115, each of which is a physical or virtual computing device. In one embodiment, client 105 and server 115 are VMs running in a data center, as described in more detail below with respect to FIG. 2.

Client 105 comprises a network interface controller (NIC) 190, in which a hook 192 has been registered by kernel 110 so that all outbound packets 150 and inbound packets 160 received by NIC 190 are routed to kernel 110. For example, hook 192 may be a software component that identifies and transmits outbound packets 150 and inbound packets 160 from a protocol stack of NIC 190 to kernel 110. In one example, hook 192 intercepts all packets when a client tries to establish a connection to a remote host, when a server gets a request to accept an incoming connection, all handshake packets (e.g., for a transport control protocol (TCP) handshake including SYN, SYN-ACK and ACK messages), and when each packet is sent or received.

In some embodiments, outbound packets 150 are packets sent from client 105 to server 115 and inbound packets 160 are packets sent from server 115 to client 105. Each packet of outbound packets 150 and inbound packets 160 may correspond to a given connection. For example, outbound packets 150 may include a client hello for a given connection, inbound packets 160 may include a server hello for the given connection, and subsequent outbound and inbound packets may include additional handshake packets for the given connection and then data packets exchanged via the given connection.

Kernel 110 may process outbound packets 150 and inbound packets 160 according to techniques described herein. For example, inbound and outbound packets may be processed at both the client side and the server side, as different policies may apply at the client side and the server side. In some embodiments, when kernel 110 receives the first packet of a connection (e.g., a client hello packet), it creates a metadata object 132 for the connection in order to track processing of packets for the connection. As described in more detail below with respect to FIG. 3, each of metadata objects 132 may store the number of packets received for a connection, whether or not the connection is secure (e.g., whether the connection employs any form of security at all or, alternatively, is a plain text connection), and an indicator of whether subsequent packets of the connection should be processed. Kernel 110 determines whether a connection is secure based on whether a form of security, such as encryption, is indicated in the packets for the connection. In some embodiments, the first packet of a connection is used to determine whether the connection is secure. For instance, if the client hello specifies a form of encryption, then the connection is determined to be secure. Conversely, if the client hello does not indicate a form of security, then the connection is determined to not be secure (e.g., a plain text connection). In some embodiments, the determination of whether a connection is secure may change after a handshake is complete, such as based on whether the client and server agree upon a form of security. Kernel 110 may update a field of a metadata object 132 for a connection to indicate whether the connection is secure. Similarly, as each packet of a connection is received, kernel 110 may update a packet counter in the metadata object 132 for the connection. Updates to metadata objects 132 are indicated by updates 170. It is noted that, in some embodiments, kernel 110 only determines whether a connection is secure at all, and does not determine a degree of security of the connection (which may be determined by the user mode application). If kernel 110 determines that a connection is plain text based on the first packet of the connection, kernel 110 may stop processing the packets (e.g., updating a value of the metadata object to indicate that subsequent packets should not be processed) and send the packet to the user mode application via packet queue 134.

Kernel 110 places each received packet of a connection into packet queue 134 (e.g., illustrated as packets 170) until the metadata object 132 for the connection indicates that packets for the connection no longer need to be processed. For example, if kernel 110 determines that a handshake for a connection is complete, it may update the metadata object 132 for the connection to indicate that subsequent packets of the connection do not need to be processed. As such, any subsequent packets of the connection received by kernel 110 will not be placed in packet queue 134. In certain embodiments, the metadata object 132 for the connection is deleted once no additional packets of the connection need to be processed. In these embodiments, if kernel 110 receives subsequent packets of the connection after the metadata object has been deleted, kernel 110 checks to see if the metadata object 132 for the connection is deleted and, if so, performs no additional processing on the packets.

In some embodiments, packets are not ordered and are placed in packet queue 134 in the order in which they were received to avoid any lag in kernel 110. All packets placed in packet queue 134 are retrieved by user mode application 122. As described in more detail below with respect to FIG. 4, user mode application 122 may sort all packets retrieved from packet queue based on connection identifiers (e.g., stream identifiers) in the packets, as packets of different connections may be interspersed in packet queue 134. Furthermore, as described below with respect to FIG. 4, user mode application 122 extracts security attributes from the packets for each connection and provides the security attributes to security engine 126. The security attributes may include, for example, security protocols, TLS versions, ciphers, certificate information and validity, and the like.

Security engine 126 receives the security attributes of the connections and consults with policy engine 124 to apply policies 136 to the connections. In an embodiment, policy engine 124 receives policies 136 from a management plane, and provides policies 136 to security engine 126 upon request. Security engine 126 determines whether each connection complies with each of policies 136 based on the security attributes. For example, a policy 136 may specify that a certain TLS version is not allowed. If the security attributes for a connection indicate that the connection uses the certain TLS version, then security engine 126 determines that the connection does not comply with the policy 136. Security engine 126 sends security determinations 180 to kernel 110, and kernel 110 takes actions based on security determination 180. For example, if a security determination 180 indicates that a connection does not comply with a policy, then kernel 110 may take action to block subsequent packets of the connection. For example, kernel 110 may drop subsequent packets of the connection and/or configure one or more additional components of client 105 block the connection. In some embodiments, instead of or in addition to blocking the connection, a notification may be sent to the administrator and/or management plane indicating that the connection does not comply with the policy. For instance, kernel 110 may send a notification via a local control plane associated with client 105 and a central control plane to the management plane. An administrator may then take action based on the notification, such as indicating that the connection should be blocked.

In some embodiments, remedial actions may be performed for a connection that does not comply with a policy. For example, subsequent packets of the connection may be provided to an additional component that applies an acceptable security technique (e.g., based on security policies defined via the management plane) to the packets before they are forwarded to their next hop.

In some embodiments, kernel 110 may update metadata objects 132 based on security determinations 180. For example, if a connection is blocked, kernel 110 may update the metadata object 132 for the connection to indicate that subsequent packets of the connection do not need to be processed.

Kernel 110 may delete a given metadata object 132 when it determines that a connection has terminated or was dropped, such as when it determines that no TLS frames or only partial TLS frames were received for the connection for a threshold period of time.

Figure 2:
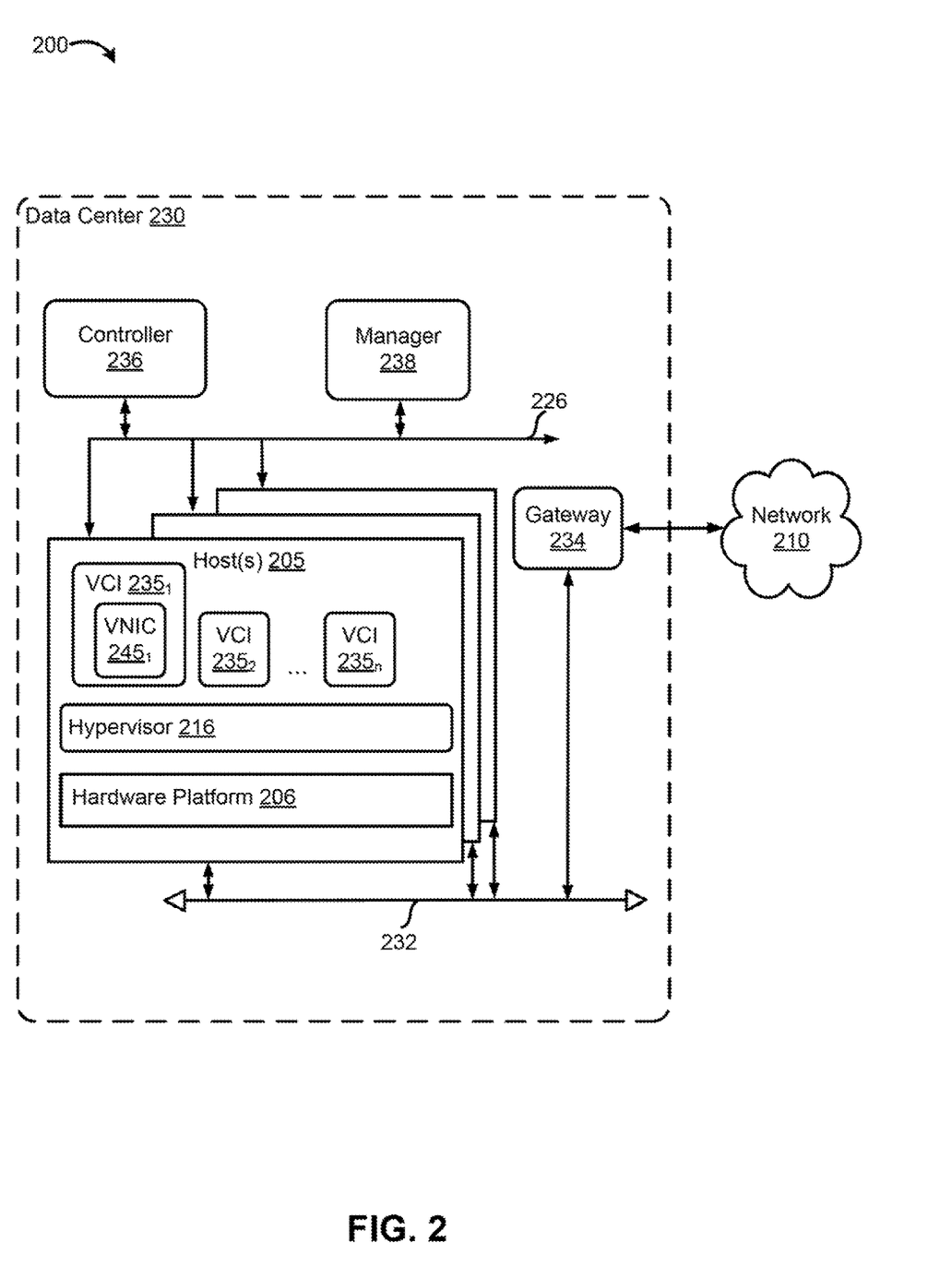
FIG. 2 depicts example physical and virtual network components with which embodiments of the present disclosure may be implemented.

FIG. 2 depicts example physical and virtual network components with which embodiments of the present disclosure may be implemented.

Networking environment 200 includes data center 230 connected to network 210. Network 210 is generally representative of a network of computing entities such as a local area network ("LAN") or a wide area network ("WAN"), a network of networks, such as the Internet, or any connection over which data may be transmitted.

Data center 230 generally represents a set of networked computing entities, and may comprise a logical overlay network. Data center 230 includes host(s) 205, a gateway 234, a data network 232, which may be a Layer 3 network, and a management network 226. Data network 232 and management network 226 may be separate physical networks or different virtual local area networks (VLANs) on the same physical network.

Each of hosts 205 may be constructed on a server grade hardware platform 206, such as an x86 architecture platform. For example, hosts 205 may be geographically co-located servers on the same rack or on different racks. Host 205 is configured to provide a virtualization layer, also referred to as a hypervisor 216, that abstracts processor, memory, storage, and networking resources of hardware platform 206 into multiple virtual computing instances (VCIs) 235$_1$ to 235$_n$ (collectively referred to as VCIs 235 and individually referred to as VCI 235) that run concurrently on the same host. VCIs 235 may include, for instance, VMs, containers, virtual appliances, and/or the like.

In one example, VCI $235_1$ represents client 105 of FIG. 1 and VCI $235_2$ represents server 115 of FIG. 1. Each of VCIs 235 has a virtual NIC (VNIC). For example, VCI $235_1$ has VNIC $245_1$, which may represent NIC 190 of FIG. 1.

Hypervisor 216 may run in conjunction with an operating system (not shown) in host 205. In some embodiments, hypervisor 216 can be installed as system level software directly on hardware platform 206 of host 205 (often referred to as "bare metal" installation) and be conceptually interposed between the physical hardware and the guest operating systems executing in the virtual machines. In certain aspects, hypervisor 216 implements one or more logical entities, such as logical switches, routers, etc. as one or more virtual entities such as virtual switches, routers, etc. In some implementations, hypervisor 216 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 235 may be replaced with containers that run on host 205 without the use of a hypervisor.

Gateway 234 provides VCIs 235 and other components in data center 230 with connectivity to network 210, and is used to communicate with destinations external to data center 230 (not shown). Gateway 234 may be a virtual computing instance, a physical device, or a software module running within host 205.

Controller 236 generally represents a control plane that manages configuration of VCIs 235 within data center 230. Controller 236 may be a computer program that resides and executes in a central server in data center 230 or, alternatively, controller 236 may run as a virtual appliance (e.g., a VM) in one of hosts 205. Although shown as a single unit, it should be understood that controller 236 may be implemented as a distributed or clustered system. That is, controller 236 may include multiple servers or virtual computing instances that implement controller functions. Controller 236 is associated with one or more virtual and/or physical CPUs (not shown). Processor(s) resources allotted or assigned to controller 236 may be unique to controller 236, or may be shared with other components of data center 230. Controller 236 communicates with hosts 205 via management network 226.

Manager 238 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 238 is a computer program that executes in a central server in networking environment 200, or alternatively, manager 238 may run in a VM, e.g. in one of hosts 205. Manager 138 is configured to receive inputs from an administrator or other entity, e.g., via a web interface or API, and carry out administrative tasks for data center 230, including centralized network management and providing an aggregated system view for a user. In an example, manager 238 provides security policies to VCIs 235, where they are enforced according to techniques described herein.

Figure 3:
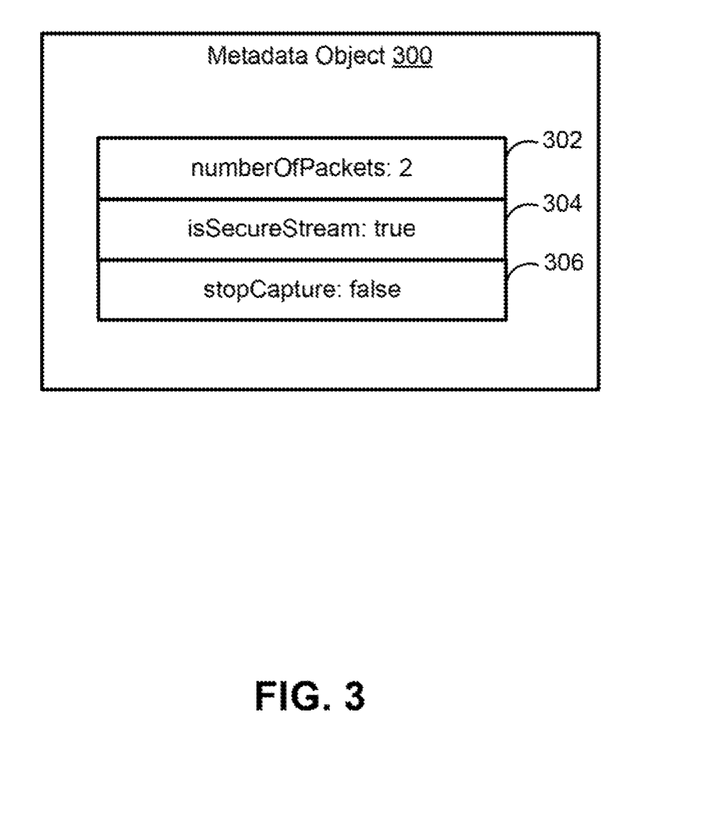
FIG. 3 depicts an example metadata object related to policy-based security enforcement according to embodiments of the present disclosure.

FIG. 3 depicts an example metadata object 300 related to policy-based security enforcement according to embodiments of the present disclosure. For example, metadata object 300 may be one of metadata objects 132 of FIG. 1. Metadata object 300 is created and updated by kernel 110 of FIG. 1, and generally represents the state of packets received for a given connection (e.g., a stream having a given stream identifier).

Value 302 indicates that the variable "numberOfPackets" is set to "2", indicating that 2 packets of the given connection have been processed. For example, kernel 110 may increment value 302 each time it processes a packet of the given connection.

Value 304 indicates that the variable "isSecureStream" is set to "true", indicating that the given connection employs some form of security, such as TLS. In some embodiments, kernel 110 of FIG. 1 sets value 304 to "true" if it determines based on the first one or more packets of the given connection that the connection is a TLS packet stream (or the connection employs another form of security). In other embodiments, kernel 110 of FIG. 1 sets value 304 to "false" if it determines based on the first one or more packets of the given connection that the connection does not employ a form of security, such as if the connection comprises only plain text packets.

Value 306 indicates that the variable "stopCapture" is set to "false", indicating that subsequent packets of the connection should continue to be processed. Kernel 110 of FIG. 1 may set value 306 to "true" if it deteimines that subsequent packets of the given connection do not need to be processed, such as if a handshake is complete. For example, kernel 110 may set value 306 to "true" when it receives application data for the given connection or when it receives a change cipher specification for the given connection.

Each time kernel 110 receives a packet of the given connection, it may check value 306 of metadata object 300 to determine whether to process the packet or simply forward it on to its next hop.

While not shown, metadata object 300 may also include additional information. For instance, metadata object 300 may also store a source IP address, destination IP address, source port, destination port, originating process information, and protocol of the given connection. The metadata object 300 may also store a stream identifier for the given connection. The stream identifier may be generated by incrementing a value for each new connection, or may be created based on attributes of the given connection, such as by combining the source IP address, destination IP address, source port, destination port, and protocol. The stream identifier may also be stored with each packet in packet queue 134 of FIG. 1.

In some embodiments (not shown), metadata object 300 also includes an "isClient" variable that indicates if this is the client or server side of the connection, a "seqNumber" variable indicating a sequence number within a connection for use in ordering the stream before parsing the stream, a "layerID" variable indicating the identifier of a network layer at which the hook is attached in the kernel, a "calloutID" variable indicating an identifier of the hook in the kernel, a "flowHandle" variable indicating the unique metadata object handle associated in the kernel, a "streamID" variable indicating an ever-incrementing number for user mode to group packets, and/or a "processID" variable indicating the identifier of the process that makes or receives the connection.

The fields of metadata object 300 may be updated over time at various layers of the protocol stack. In some embodiments, metadata objects are stored in a splay tree for fast lookup, insertion, and removal.

Figure 4:
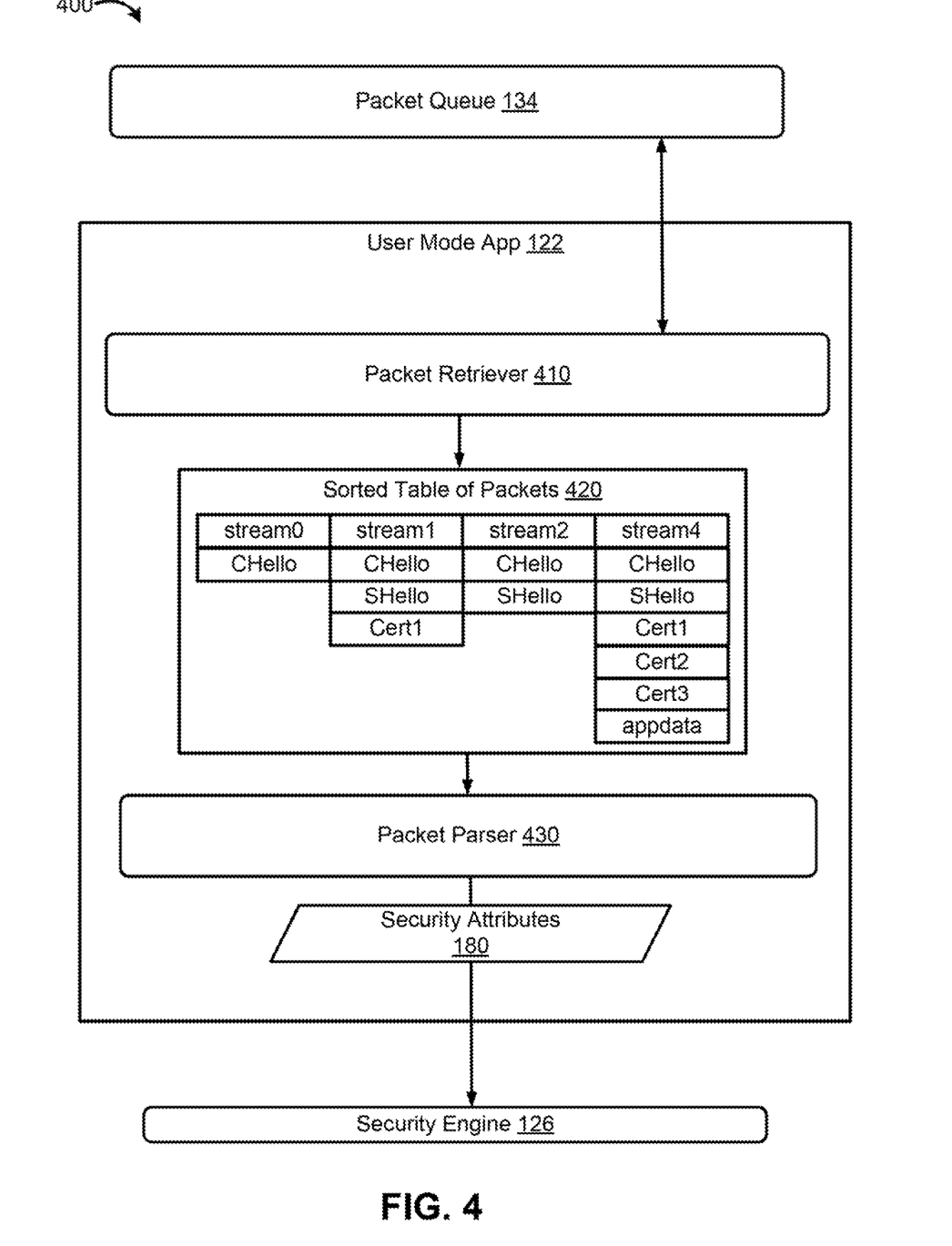
FIG. 4 depicts an example system related to policy-based security enforcement according to embodiments of the present disclosure.

FIG. 4 depicts an example system 400 related to policy-based security enforcement according to embodiments of the present disclosure. Example system 400 depicts additional aspects of user mode app 122 of FIG. 1, and includes packet queue 134 and security engine 126 of FIG. 1.

In example system 400, a packet retriever 410 of user mode app 122 retrieves packets from packet queue 134. Packet retriever 410 generally represents a thread belonging to a thread pool in user mode app 122, and may retrieve packets via a connection with the kernel 110. The packets may have been placed into packet queue 134 by kernel 110 of FIG. 1. In some embodiments, kernel 110 of FIG. 1 also stores a stream length in packet queue 134 for each connection, such as based on how many packets of the connection have been received, as well as whether each packet is inbound or outbound. Each packet in packet queue 134 generally includes a source and destination address, a source and destination port, a stream identifier, and the like. Packet retriever 410 sorts the packets into a sorted table 420 of packets.

As shown, packets are sorted in table 420 based on stream identifiers (e.g., which may have been generated by the kernel based on a combination of connection attributes), such that all packets of a given connection are grouped together in order. For example, in table 420, only a client hello packet has been received for connection "stream0". For connection "stream1", a client hello, a server hello, and a first certificate packet have been received. For connection "stream2", a client hello and server hello packet have been received. For connection "stream4", a client hello, server hello, first certificate, second certificate, third certificate, and an application data packet have been received. It is noted that the packets in table 420 may have been in a different order in packet queue 134. For instance, the server hello for "stream4" could have been received by kernel 110 of FIG. 1 before the server hello of "stream1", and so the server hello for "stream4" may appear in packet queue 134 before the server hello of "stream1".

Packet retriever 410 and/or packet parser 430 monitors each connection in table 420 to determine when a handshake is complete for the connection before the packets of the connection are parsed to extract security attributes. For example, in table 420, "stream4" has a completed handshake because an application data packet has been received. As such, packet parser 430 will parse the packets of "stream4" to extract security attributes 180. In some embodiments, security attributes 180 include a TLS version, ciphers being used to encrypt traffic, a server indicated in the client hello, server certificates sent by the server in the server hello message, whether the connection is a resume of an earlier sessions, and/or the like. In some embodiments, security attributes 180 are output in the form of a security report for a given connection.

Security attributes 180 are passed to security engine 126, which consults with policy engine 124 of FIG. 1 to enforce security policies. For instance, security engine 126 may determine whether connection "stream4" complies with a security policy that prohibits a certain TLS version by determining whether the security attributes 180 of "stream4" indicate that "stream4" uses the certain TLS version. Security engine 126 then sends security determinations to kernel 110 of FIG. 1.

While certain embodiments involve waiting until a handshake is complete to apply policies, this may not be necessary in all cases. For example, if the first packet of a connection indicates that no security is to be used for the connection (e.g., indicating that the connection is a plain text connection), then a security determination may be made based on the first packet.

It is noted that both the client and the server may perform techniques described herein for policy-based security enforcement. On the server side, an order of inbound and outbound packets may be reversed when ordering packets for a connection because the order of inbound and outbound packets is different (e.g., a client hello will be inbound and a server hello will be outbound).

Security engine 126 may block or report a connection that is being made to a blacklisted server (e.g., based on a security policy) by only examining the first SYN packet of a TCP handshake of the connection, because the server will be identified in the SYN packet. In some embodiments, security engine 126 may take necessary actions, such as blocking or reporting, for a connection as soon as it has examined the first TCP frame of the connection, such as if plain text is seen in the first frame after the handshake is complete or if the client hello message does not comply with a security policy.

In some embodiments, the policy engine and security engine can be placed in learning mode first in order to learn behavior and can then be placed in integrity mode to make decisions based on the data gathered during learning mode.

Figure 5:
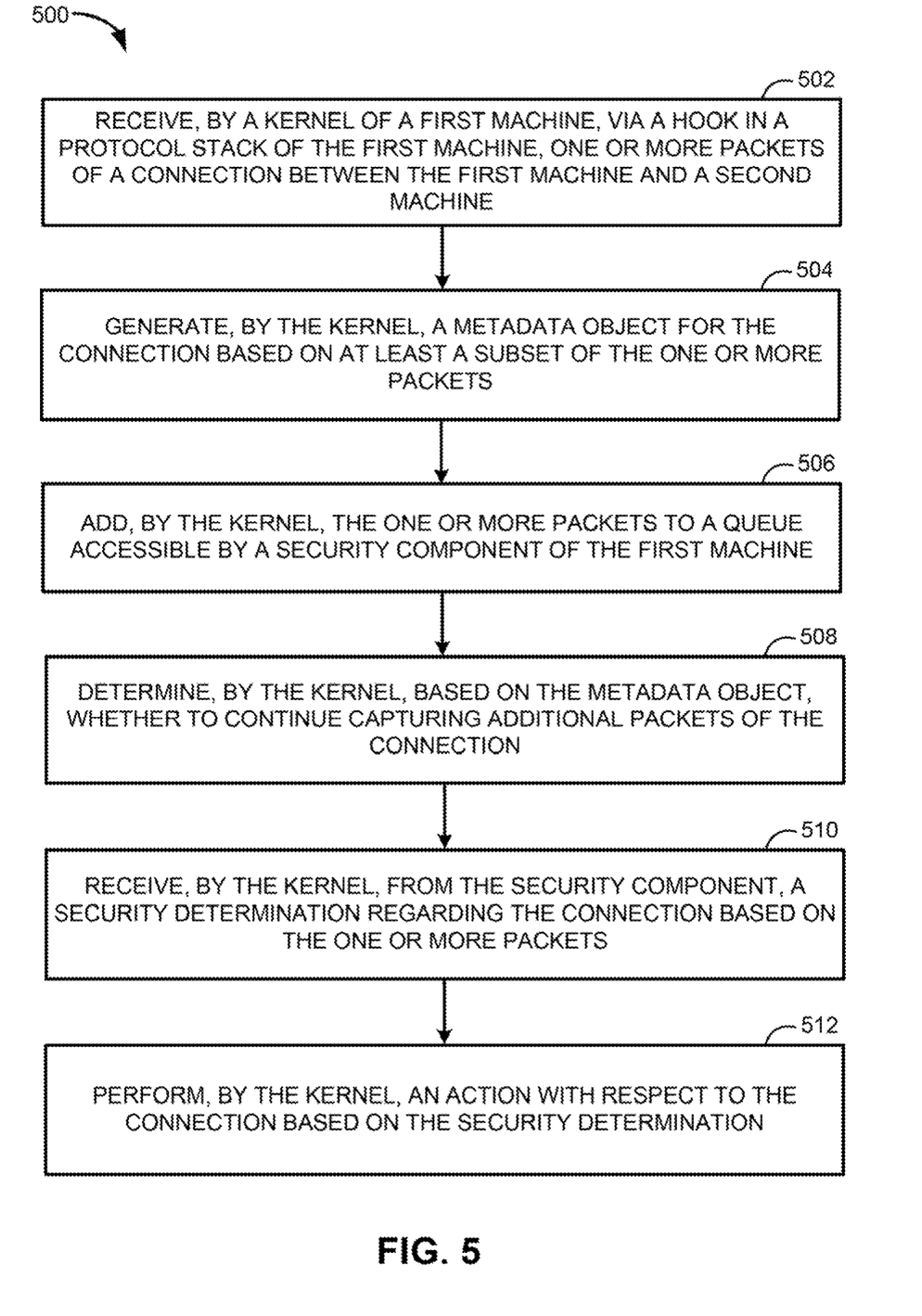
FIG. 5 depicts example operations for policy-based security enforcement according to embodiments of the present disclosure.

FIG. 5 depicts example operations 500 for workload labeling according to embodiments of the present disclosure. For example, operations 500 may be performed by kernel 110 of FIG. 1.

Operations 500 begin with step 502, where a kernel of a first machine receives, via a hook in a protocol stack of the first machine, one or more packets of a connection between the first machine and a second machine. For example, the first machine may be client 105 of FIG. 1 and the second machine may be server 115 of FIG. 1.

Operations 500 continue with step 504, where the kernel generates a metadata object for the connection based on at least a subset of the one or more packets. For instance kernel 110 of FIG. 1 may generate metadata object 300 of FIG. 3 based on a first packet received for the connection, and may update the metadata object as subsequent packets of the connection are received.

Operations 500 continue with step 506, where the kernel adds the one or more packets to a queue accessible by a security component of the first machine In an embodiment, kernel 110 of FIG. 1 adds all packets of the connection to packet queue 134 of FIG. 1 up until the first application data packet is received. After the first application data packet is received, kernel 110 of FIG. 1 may add the first application data packet to packet queue 134 of FIG. 1 and then set a "stopCapture" value of the metadata object to "true" so that subsequent packets of the connection will not be processed, and will simply be forwarded on to their next hop.

Operations 500 continue with step 508, where the kernel determines, based on the metadata object, whether to continue capturing additional packets of the connection. In an embodiment, kernel 110 of FIG. 1 checks the "stopCapture" value of the metadata object to determine whether to continue capturing additional packets of the connection.

Operations 500 continue with step 510, where the kernel receives, from the security component, a security determination regarding the connection based on the one or more packets. In an embodiment, security engine 126 applies a security policy to security attributes extracted from the one or more packets, and sends the security determination to kernel 110 of FIG. 1.

Operations 500 continue with step 512, where the kernel performs an action with respect to the connection based on the security determination. The action may include, for example, generating a notification based on the security determination, blocking subsequent packets of the connection based on the security determination, allowing the subsequent packets of the connection based on the security determination, modifying the subsequent packets of the connection based on the security determination (e.g., to apply an approved security technique, remove unsecure content, or the like), providing the subsequent packets of the connection to another component based on the security determination (e.g., another security component that will apply an approved security technique to the subsequent packets), updating an existing policy to allow this type of connection (e.g., in the case of learning mode), and/or the like.

Certain embodiments further include determining, by the kernel, that the connection has terminated and deleting, by the kernel, the metadata object.

Some embodiments further include determining, by the kernel, based on the one or more packets, whether the connection comprises a transport layer security (TLS) stream.

Certain embodiments further comprise setting, by the kernel, a value of the metadata object based on whether the connection comprises the TLS stream.

In some embodiments, the one or more packets comprise a TLS handshake.

Certain embodiments further include determining, by the kernel, that the TLS handshake is complete (e.g., when the kernel receives an application data packet for the connection) and updating, by the kernel, a value of the metadata object to indicate that capturing is to be stopped. In some embodiments, determining whether to continue capturing the additional packets of the connection comprises accessing the value of the metadata object.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of network security, comprising:
   receiving, by a kernel of a first machine, via a hook in a protocol stack of the first machine, one or more packets of a connection between the first machine and a second machine;
   generating, by the kernel, a metadata object for the connection based on at least a subset of the one or more packets, the metadata object comprising an indicator of whether to capture packets of the connection into a queue;
   adding, by the kernel, the one or more packets to the queue accessible by a security component of the first machine;
   receiving, by the kernel, from the security component, a security determination regarding the connection based on the one or more packets added to the queue, wherein the metadata object is updated based on the security determination;
   performing, by the kernel, an action with respect to the connection based on the security determination; and
   determining, by the kernel, based on the indicator of the updated metadata object, whether to continue capturing additional packets of the connection in the queue.

2. The method of claim 1, wherein the action comprises one or more of:
   generating a notification based on the security determination;
   blocking subsequent packets of the connection based on the security determination;
   allowing the subsequent packets of the connection based on the security determination;
   modifying the subsequent packets of the connection based on the security determination; or
   providing the subsequent packets of the connection to another component based on the security determination.

3. The method of claim 1, further comprising:
   determining, by the kernel, that the connection has terminated; and
   deleting, by the kernel, the metadata object.

4. The method of claim 1, further comprising determining, by the kernel, based on the one or more packets, whether the connection comprises a transport layer security (TLS) stream.

5. The method of claim 4, further comprising setting, by the kernel, a value of the metadata object based on whether the connection comprises the TLS stream.

6. The method of claim 1, wherein the one or more packets comprise a handshake.

7. The method of claim 6, further comprising:
   determining, by the kernel, that the handshake is complete; and
   updating, by the kernel, the indicator of the metadata object to indicate that capturing is to be stopped.

8. An apparatus for network security, comprising:
   one or more hardware processors operating a kernel, wherein the kernel is configured to:
      receive, via a hook in a protocol stack of the apparatus, one or more packets of a connection between the apparatus and a second machine;
      generate a metadata object for the connection based on at least a subset of the one or more packets, the metadata object comprising an indicator of whether to capture packets of the connection into a queue;
      add the one or more packets to the queue accessible by a security component of the apparatus;
      receive, from the security component, a security determination regarding the connection based on the one or more packets added to the queue, wherein the metadata object is updated based on the security determination;
      perform an action with respect to the connection based on the security determination; and
      determine, based on the indicator of the updated metadata object, whether to continue capturing additional packets of the connection into the queue; and
   a security component configured to:
      retrieve the one or more packets from the queue;
      make the security determination regarding the connection based on the one or more packets; and
      send the security determination regarding the connection to the kernel.

9. The apparatus of claim 8, wherein the action comprises one or more of:
   generating a notification based on the security determination;
   blocking subsequent packets of the connection based on the security determination;
   allowing the subsequent packets of the connection based on the security determination;
   modifying the subsequent packets of the connection based on the security determination; or
   providing the subsequent packets of the connection to another component based on the security determination.

10. The apparatus of claim 8, wherein the kernel is further configured to:
    determine that the connection has terminated; and
    delete the metadata object.

11. The apparatus of claim 8, wherein the kernel is further configured to determine, based on the one or more packets, whether the connection comprises a transport layer security (TLS) stream.

12. The apparatus of claim 11, wherein the kernel is further configured set a value of the metadata object based on whether the connection comprises the TLS stream.

13. The apparatus of claim 8, wherein the one or more packets comprise a handshake.

14. The apparatus of claim 13, wherein the kernel is further configured to:
- determine that the handshake is complete; and
- update the indicator of the metadata object to indicate that capturing is to be stopped.

15. A non-transitory computer-readable medium comprising instructions that, when executed by one or more processors of a computing system, cause the computing system to perform a method of network security, the method comprising:
- receiving, by a kernel of a first machine, via a hook in a protocol stack of the first machine, one or more packets of a connection between the first machine and a second machine;
- generating, by the kernel, a metadata object for the connection based on at least a subset of the one or more packets, the metadata object comprising an indicator of whether to capture packets of the connection into a queue;
- adding, by the kernel, the one or more packets to the queue accessible by a security component of the first machine;
- receiving, by the kernel, from the security component, a security determination regarding the connection based on the one or more packets added to the queue, wherein the metadata object is updated based on the security determination;
- performing, by the kernel, an action with respect to the connection based on the security determination; and
- determining, by the kernel, based on the indicator of the updated metadata object, whether to continue capturing additional packets of the connection in the queue.

16. The non-transitory computer-readable medium of claim 15, wherein the action comprises one or more of:
- generating a notification based on the security determination;
- blocking subsequent packets of the connection based on the security determination;
- allowing the subsequent packets of the connection based on the security determination;
- modifying the subsequent packets of the connection based on the security determination; or
- providing the subsequent packets of the connection to another component based on the security determination.

17. The non-transitory computer-readable medium of claim 15, wherein the method further comprises:
- determining, by the kernel, that the connection has terminated; and
- deleting, by the kernel, the metadata object.

18. The non-transitory computer-readable medium of claim 15, wherein the method further comprises determining, by the kernel, based on the one or more packets, whether the connection comprises a transport layer security (TLS) stream.

* * * * *